United States Patent [19]

Prinz et al.

[11] Patent Number: 4,862,571
[45] Date of Patent: Sep. 5, 1989

[54] METHOD OF MAKING A VALVE SLEEVE

[75] Inventors: Thomas K. Prinz, St. Clair Shores; Stephen A. Dier, Fraser, both of Mich.

[73] Assignee: TRW Inc., Lyndhurst, Ohio

[21] Appl. No.: 214,421

[22] Filed: Jul. 1, 1988

Related U.S. Application Data

[63] Continuation-in-part of Ser. No. 89,599, Aug. 26, 1987, Pat. No. 4,799,303.

[51] Int. Cl.⁴ .............................................. B21D 53/10
[52] U.S. Cl. .................................. 29/157.1 R; 29/557; 72/370
[58] Field of Search ................... 29/157.1 R, 557, 558; 72/370, 341

[56] References Cited

U.S. PATENT DOCUMENTS

| | | |
|---|---|---|
| 1,422,655 | 7/1922 | Brehmer . |
| 1,870,970 | 8/1932 | Stevenson . |
| 2,737,831 | 3/1956 | Webb ................................ 72/341 X |
| 4,419,877 | 12/1983 | Alfano .................................. 72/370 |
| 4,535,519 | 8/1985 | Kajikawa et al. .................... 29/558 |
| 4,543,813 | 10/1985 | Rogers ............................ 72/370 X |
| 4,614,014 | 9/1986 | Ferguson ..................... 29/157.1 R |
| 4,689,864 | 9/1987 | Fukuma et al. .............. 29/157.1 R |

Primary Examiner—Howard N. Goldberg
Assistant Examiner—Irene Cuda
Attorney, Agent, or Firm—Tarolli, Sundheim & Covell

[57] ABSTRACT

In manufacturing a tubular valve sleeve having axially extending grooves on its inner surface, the valve sleeve groove ends are closed by radially inward displacement of sleeve material, which is limited by a mandrel to minimize the formation of cracks in the material. First, a tubular member is provided which has a plurality of grooves extending axially along an inner surface of the tubular member through the axially opposite end surfaces of the tubular member. The end surfaces extend radially outward from the inner surface of the tubular member to the outer surface. Each of the axially extending grooves has a base surface located between the inner and outer surfaces. A pair of first punches are simultaneously forcefully abutted against the end surfaces, between the base surface of each groove and the outer surface. This displaces material of the end surface adjacent each groove radially inwardly of the inner surface. A mandrel inside the tubular member limits radially inward displacement of the material by engagement of the material with the mandrel.

11 Claims, 3 Drawing Sheets

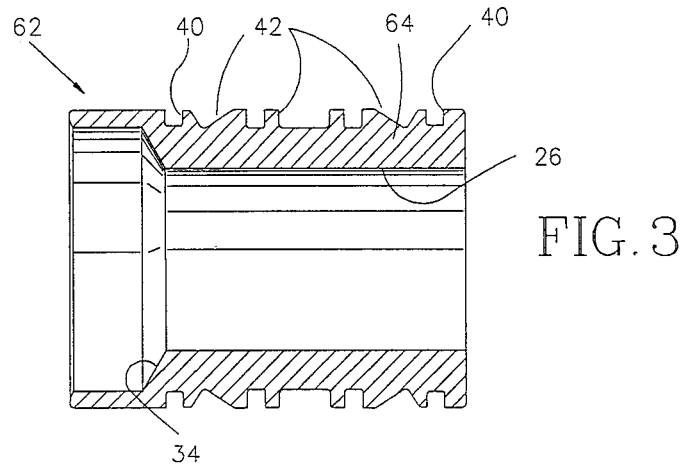
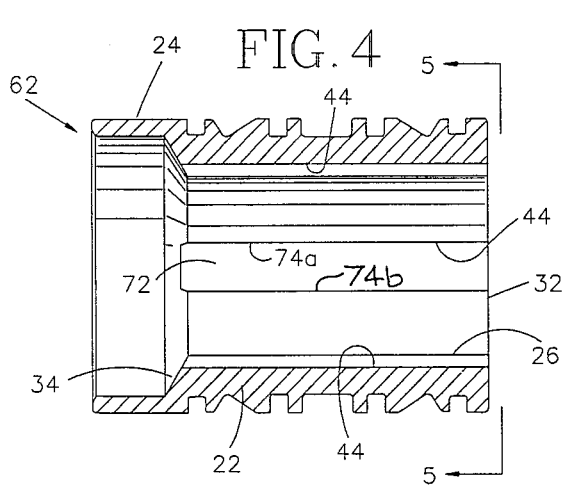
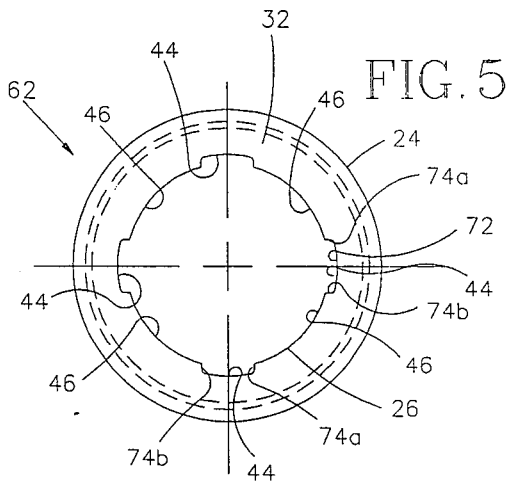
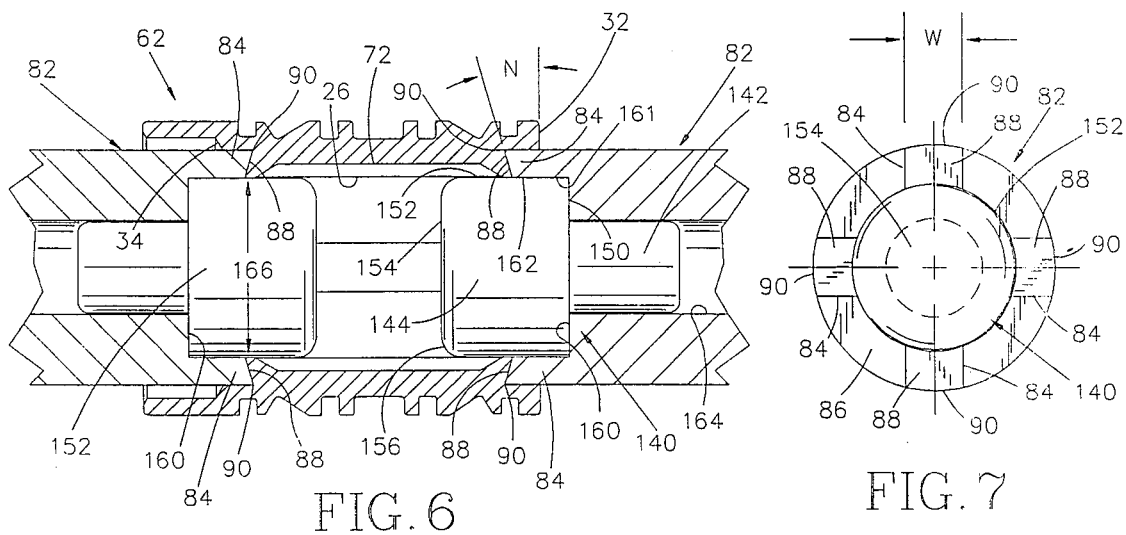

METHOD OF MAKING A VALVE SLEEVE

BACKGROUND OF THE INVENTION

This application is a continuation-in-part of our co-pending application Ser. No. 089,599 filed Aug. 26, 1987 entitled "Method of Making a Valve Sleeve", now U.S. Pat. No. 4,799,303.

1. Technical Field

The present invention relates to a method of manufacturing a valve sleeve, and particularly to a method of manufacturing a valve sleeve for use in a hydraulic power steering gear of a vehicle.

2. Description of the Prior Art

A typical hydraulic power steering gear for a vehicle includes a control valve for controlling directional assist as called for by turning movement of the vehicle steering wheel. The control valve includes a valve sleeve and a valve core located coaxially within the valve sleeve. Turning movement of the vehicle steering wheel causes relative rotation between the valve sleeve and the valve core. Upon relative rotation between the valve sleeve and valve core, fluid flow is directed from a power steering pump through the valve core and valve sleeve (i) to one of a pair of fluid assist chambers in a power assist motor and (ii) from the other one of the pair of fluid assist chambers of the power assist motor to a reservoir.

The valve sleeve typically has a plurality of axially extending grooves in an inner surface of the valve sleeve. Adjacent axially extending grooves in the inner surface are separated by an axially extending land. Each of the grooves is closed at axially opposite ends by seal lands of the valve sleeve. The seal lands have a radius equal to the radius of the axially extending lands. The seal lands have a close fit with the valve core to restrict axial flow of fluid between the valve sleeve and valve core.

Our co-pending application Ser. No. 089,599, filed Aug. 26, 1987, discloses a method of forming the seal lands in a valve sleeve. The valve sleeve is made from a tubular member having a plurality of grooves extending axially along an inner surface of the tubular member and through a pair of axially opposite end surfaces of the tubular member. The end surfaces extend radially outward from an inner surface of the tubular member to an outer surface. Each of the axially extending grooves has a base surface located between the inner and outer surfaces. The method involves forcefully abutting a first punch against at least one of the end surfaces between the base surface of each groove and the outer surface to displace material of the end surface adjacent each groove radially inwardly of the inner surface. The method also includes then forcefully abutting a second punch, located inside the tubular member, against the displaced material of the end surface which extends radially inwardly of the inner surface, and moving a portion of the displaced material axially and radially outwardly to form a seal land at the end of the groove.

The method disclosed in our co-pending application may result in the sleeve material cracking if it is displaced too far radially inward. This is especially true if the sleeve is made of a material such as SAE 1144 steel, which is relatively brittle and not well suited for cold forming.

Other methods of making valve sleeves are disclosed in U.S. Pat. Nos. 4,419,877 and 4,614,014. These patents do not, however, address the problem of material cracking due to excessive displacement of material. In U.S. Pat. No. 4,419,877 a tubular member is provided having a plurality of grooves in its inner surface which extend completely through the axially opposite end surfaces of the tubular member. The ends of the grooves are closed by bringing punches having concave faces into forceful engagement with the opposite axial end surfaces of the tubular member. Material is displaced radially inwardly by the punches to form a continuous annular bead of material at each axial end surface of the tubular member, which closes the ends of the grooves. In U.S. Pat. No. 4,614,014 a tubular member is provided having a plurality of grooves in its inner surface which extend completely through axially opposite end surfaces of the tubular member. An annular groove is machined in each of the end surfaces of the tubular member radially outwardly of the inner surface of the tubular member. A tool forcefully engages a wall of each annular groove to displace material of the end surfaces radially inwardly of the inner surface of the tubular member. Each of these known methods displaces material of a tubular member radially inwardly. None of these methods, however, identifies or addresses the problem of cracking caused by excessive displacement of material.

SUMMARY OF THE INVENTION

In accordance with the present invention, when valve sleeve groove ends are closed by radially inward displacement of material, such inward displacement is limited so as to minimize the formation of cracks in the material.

The method of manufacturing a valve sleeve in accordance with the present invention includes the steps of providing a tubular member having a plurality of grooves extending axially in an inner surface of the tubular member. The grooves extend completely through axially opposite end surfaces of the tubular member. The end surfaces extend radially outwardly from the inner surface of the tubular member to an outer surface. Each of the grooves has a base surface located between the inner and outer surfaces. A first punch is brought into engagement against at least one of the end surfaces of the tubular member. The first punch forcefully engages the one end surface between the base surface of each groove and the outer surface of the tubular member. The first punch then displaces material of the one end surface adjacent each groove, radially inwardly beyond the inner surface. Preferably, a pair of first punches are moved axially toward the tubular member to simultaneously engage both of the end surfaces of the tubular member to close the opposite ends of each groove.

Each of the pair of first punches includes a cylindrical mandrel projecting beyond the end face of the punch. When the punch abuts the end face of the valve sleeve to deform the valve sleeve, at least a portion of the mandrel is disposed within the valve sleeve. The mandrel is only slightly smaller in diameter than the inner dimension of the valve sleeve. When the punches cause the displaced material to flow radially inwardly, the inwardly moving material abuts the mandrel and thus is prevented from further inward movement. By limiting the inward flow of material, the tendency of cracks to form in the material is minimized.

BRIEF DESCRIPTION OF THE DRAWINGS

Further features of the present invention will become apparent to those skilled in the art to which the present invention relates from reading the following specification with reference to the accompanying drawings, in which:

FIG. 3 is a longitudinal cross sectional view of a valve sleeve blank;

FIG. 4 is a longitudinal cross sectional view of the valve sleeve blank of FIG. 3 having axially extending grooves formed therein;

FIG. 5 is an end elevational view taken along the line 5—5 of FIG. 4;

FIG. 6 is a longitudinal cross sectional view of the valve sleeve blank engaged by a pair of first punches with mandrels projecting into the valve sleeve blank;

FIG. 7 is an end view of one of the punches in FIG. 6;

DESCRIPTION OF A PREFERRED EMBODIMENT

Figure 2:
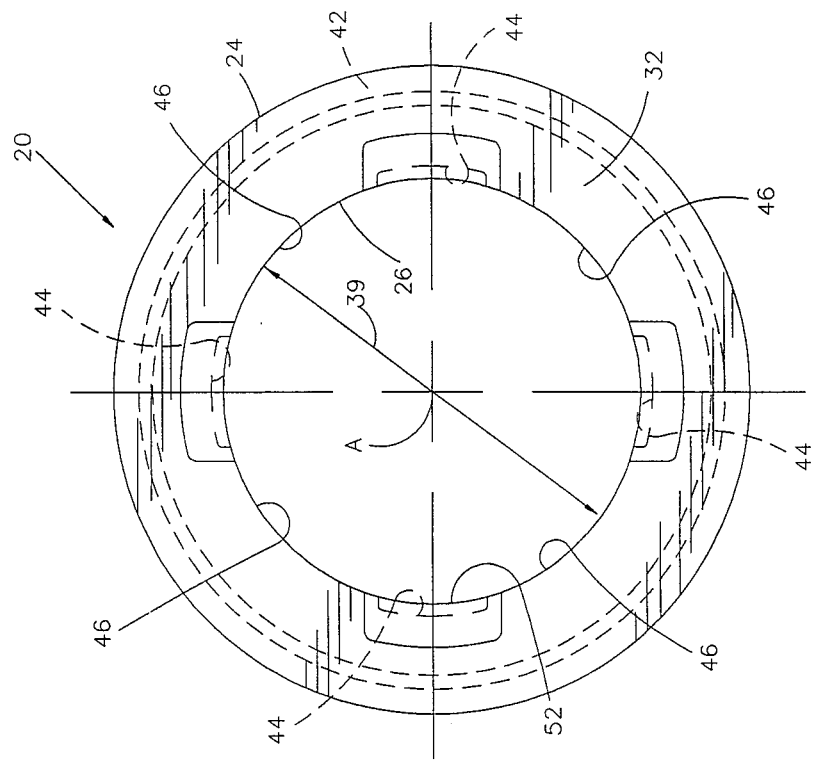
FIG. 2 is an end elevational view taken along line 2—2 of FIG. 1.
Figure 1:
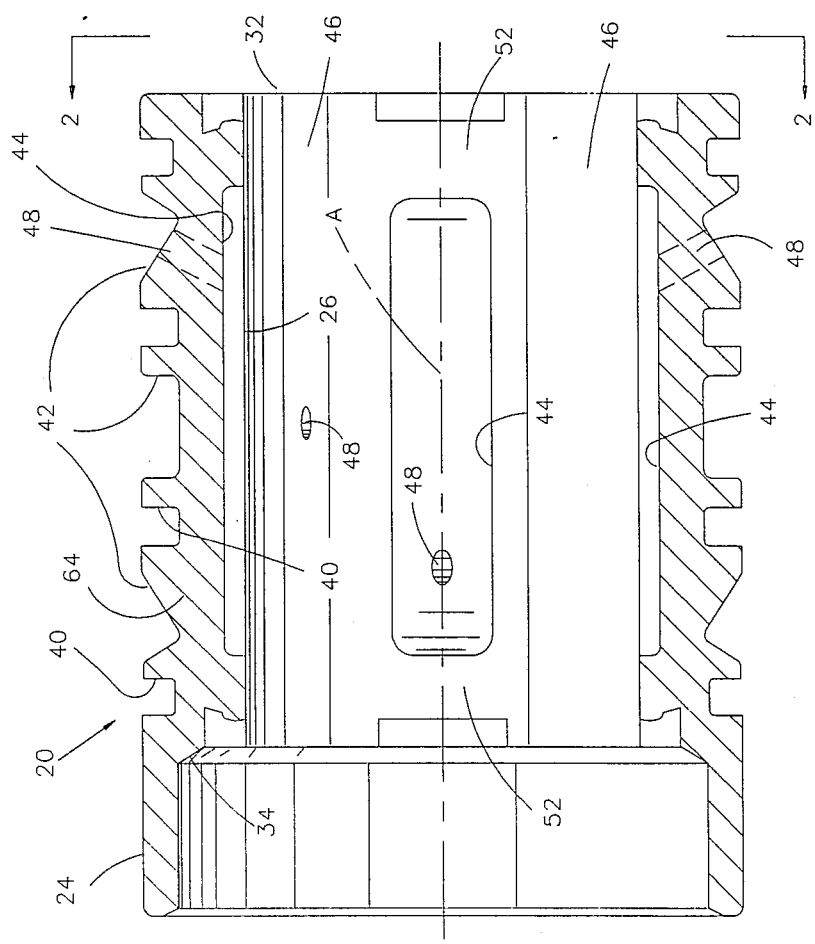
FIG. 1 is an enlarged longitudinal cross sectional view of a valve sleeve made according to the method of the present invention.

A finished valve sleeve 20 made according to the method embodying the present invention is illustrated in FIGS. 1 and 2. The valve sleeve 20 has an outer surface 24 and an inner surface 26. The valve sleeve 20 also has a pair of radially extending end surfaces 32, 34. The end surfaces 32, 34 extend from the inner surface 26 to the outer surface 24. The inner surface 26 has a finished diameter represented by the numeral 39 (see FIG. 2).

A plurality of annular grooves 42 are formed in the outer surface 24 of the valve sleeve 20. The annular grooves 42 allow fluid communication of the valve sleeve 20 with ports in a hydraulic power steering gear housing (not shown), as is known. The annular grooves 42 extend circumferentially around the outer surface 24 and are axially spaced along the valve sleeve 20. A plurality of annular seal grooves 40 are also formed in the outer surface 24 of the valve sleeve 20 for receiving a seal (not shown) to block fluid leakage between adjacent annular grooves 42.

A plurality of axially extending grooves 44 are formed in the inner surface 26 of the valve sleeve 20. Adjacent grooves 44 are separated by a respective one of a plurality of axially extending lands 46. A plurality of radially extending passages 48 connect the annular grooves 42 with grooves 44 for fluid communication, as is known. A pair of seal lands 52 are located at axially opposite end portions of the valve sleeve 20.

The seal lands 52 extend circumferentially along the inner surface 26 of the valve sleeve 20. The axially extending lands 46 and seal lands 52 are arcuate surfaces having the same diameter as the diameter 39 of the inner surface 26. The axially extending lands 46 cooperate with axially extending lands on the valve core, as is known. Such cooperation between the lands selectively blocks and allows fluid flow through the grooves 44 of the valve sleeve 20 upon relative rotation between the valve core and valve sleeve. The seal lands 52 have a close fit with the outer circumference of the valve core to restrict fluid flow axially outward from the ends of the grooves 44. While only four axially extending grooves 44 and four lands 46 are used in the valve sleeve 20, it should be apparent that a different number of grooves and lands could be used depending on the application of the valve sleeve.

In order to manufacture the finished valve sleeve 20, a valve sleeve blank 62 (FIG. 3) is provided. The valve sleeve blank 62 is formed from a metal tubular member 64. The annular grooves 42, passages 48 and seal grooves 40 are machined in the valve sleeve blank 62.

The valve sleeve blank 62 is placed in a fixture (not shown), and broached to form the plurality of grooves 44 in the inner surface 26, as illustrated in FIGS. 4 and 5. Forming the grooves 44 also defines the locations of the axially extending lands 46. Each of the grooves 44 when initially formed extends axially and completely through the end surfaces 32, 34. Each of the grooves 44 has a base surface 72 and a pair of generally parallel side surfaces 74a, 74b. The base surface 72 of the groove 44 is located between the inner surface 26 and the outer surface 24.

A pair of first punches 82 (FIGS. 6 and 7) is then moved axially into forceful engagement with the end surfaces 32, 34 of the valve sleeve blank 62. Each of the pair of first punches 82 has a plurality of projections 84 extending from an end face 86. Each of the projections 84 has a planar surface 88 for engaging an end surface 32, 34 of the valve sleeve blank 62. The number of projections 84 extending from the end face 86 of each of the first punches 82 corresponds to the number of grooves 44 in the valve sleeve blank 62. Four projections 84 are shown extending from the end face 86 of each of the first punches 82. The valve sleeve blank 62 is indexed relative to the punch 82 so that each of the projections 84 is axially aligned with a respective groove 44.

Each of the projections 84 has a width W which is slightly greater than the width of a respective groove 44. The width of a groove 44 is defined by the distance between the side surfaces 74a, 74b (FIG. 5) of the groove. Thus, each of the projections 84 has a width W which permits the projection to engage only material of the end surfaces 32, 34 immediately adjacent and axially aligned with the ends of each of the grooves 44.

Each of the projections 84 has a planar surface 88 disposed at an angle N (FIG. 6) to the direction of movement of the first punches 82 as they move axially toward a valve sleeve blank 62. The angle N is such that the radial outermost portion or leading edge 90 of the planar surface 88 will be the first portion of the projection 84 to engage the end surfaces 32, 34 of the valve sleeve blank 62. Each leading edge 90 shears a portion of the material from the valve sleeve blank 62 as the projections 84 are advanced into the end surfaces 32, 34. The planar surfaces 88 are angled rearwardly relative to the direction in which the first punches 82 are advanced. Thus, the material 92 engaged by a projection 84 (FIG. 8) is forced radially inwardly along the planar surface 88 as the first punch 82 advances, until the material is displaced radially inwardly of the inner surface 26. The first punches 82 displace material 92 radially inwardly only adjacent each end of the grooves 44. The displaced material 92 closes the ends of the grooves 44. Since the first punches 82 displace only the material adjacent the ends of the grooves 44, there is a minimal risk of deforming the valve sleeve blank 62 as compared to the process disclosed in U.S. Pat. No. 4,419,877.

The valve sleeve 62 is preferably made of a material such as SAE 1144 steel. SAE 1144 steel is a machining material, not a cold forming material, and it is relatively brittle, and if it flows too far when cold formed, cracks may form in the material.

In order to limit inward radial displacement of the material of valve sleeve blank 62, each of the pair of first punches 82 includes a mandrel 140 (FIG. 6) projecting axially beyond the end face 86 of the punch 82. The mandrel 140 moves axially along with the punch 82, when the punch 82 is moved axially to form the lands 52. When the punch 82 abuts the end surface 32 of the valve sleeve 62, the mandrel 140 is disposed within the valve sleeve 62 and limits the flow of material radially inward.

Each mandrel 140 includes a shank portion 142 and a generally cylindrical head end portion 144. The head end portion 144 includes a rear facing shoulder 150, a cylindrical outer, side surface 152, and a front face 154. The outer side surface 152 and the front face 154 are joined at a rounded corner surface 156. At least the cylindrical outer side surface 152 of the mandrel is preferably hard surfaced with a titanium nitride coating, to give better tool life and to prevent galling or picking up or welding between the mandrel 140 and the material of the valve sleeve blank 26.

The mandrel 140 is fit axially into the first punch 82. A rear portion 161 of the mandrel head end portion 144 is slip fit into a bore 162 in the punch 82. The shank portion 142 of the mandrel 140 is press fit into a bore 164 in the punch 82. The rear facing shoulder 150 of the mandrel head end portion 144 abuts a forward facing shoulder 160 on the punch 82.

The head end portion 144 of the mandrel 140 has an outer dimension or diameter 166 which is less than the inside diameter 39 of the valve sleeve 62. Thus, as the pair of first punches 82 are moved axially inwardly relative to valve sleeve 62 in order to deform the valve sleeve, the mandrel head end portions 144 will fit within the bore in the valve sleeve 62. The outer dimension 166 of the mandrel head end portion 144 is large enough to limit radial inward movement of the material displaced by punch 82.

In the preferred embodiment, the mandrel 140 is a separate piece which is fixed to the first punch 82. It should be understood, however, that the mandrel 140 may be formed integrally with the first punch 82, or that it may be separated from the first punch 82. What is important is that at least a portion of the mandrel 140 be disposed within the valve sleeve 62 when the first punch 82 engages the end surface 34. The mandrel 140 is also preferably centered radially with respect to the first punch 82. The first punch 82, with the mandrel 140 fixed thereto, is preferably centered radially with respect to the valve sleeve blank 62 when the first punch 82 engages the valve sleeve blank 62. Thus, the material of the blank 62 will be deformed uniformly radially inwardly.

Figure 8:
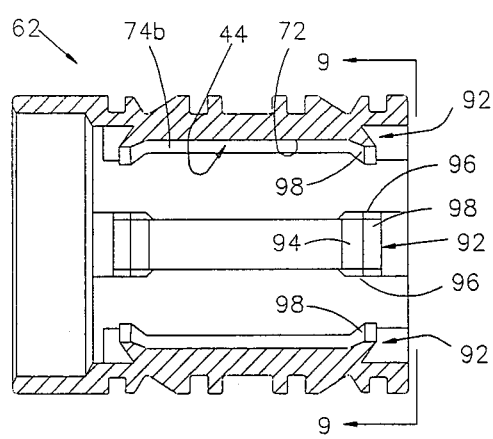
FIG. 8 is a longitudinal cross sectional view of the valve sleeve blank after engagement with the pair of first punches.
Figure 9:
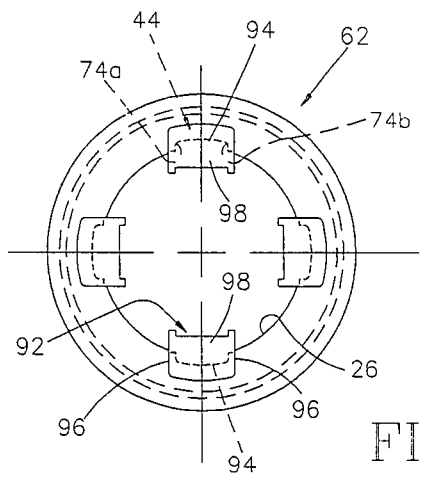
FIG. 9 is an end elevational view taken along line 9—9 of FIG. 8.
Figure 11:
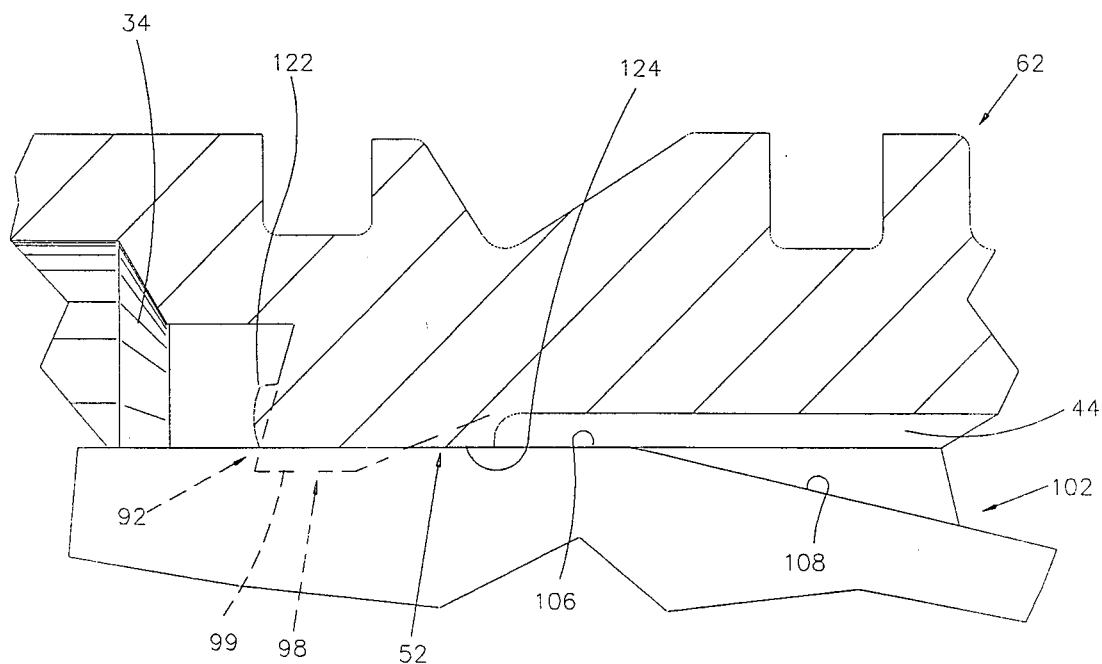
FIG. 11 is an enlarged view of a portion of FIG. 10 illustrating how material of the valve sleeve blank is displaced by one of the pair of second punches.

The material 92 (see FIG. 11) which is displaced from the end surfaces 32, 34 of the valve sleeve blank 62 by the pair of first punches 82, as viewed in FIGS. 8, 9 and 11, is made up of three components. The three components of the displaced material 92 include material 94 adjacent the base 72 of each groove 44, material 96 adjacent each of the side surfaces 74a, 74b of each groove, and material 98 projecting radially inwardly of the inner surface 26. It can be seen from FIG. 11 that the material 98 has a flattened surface 99 where its radially inward movement has been limited by engagement with the outer side surface 152 of the mandrel 140.

Figure 10:
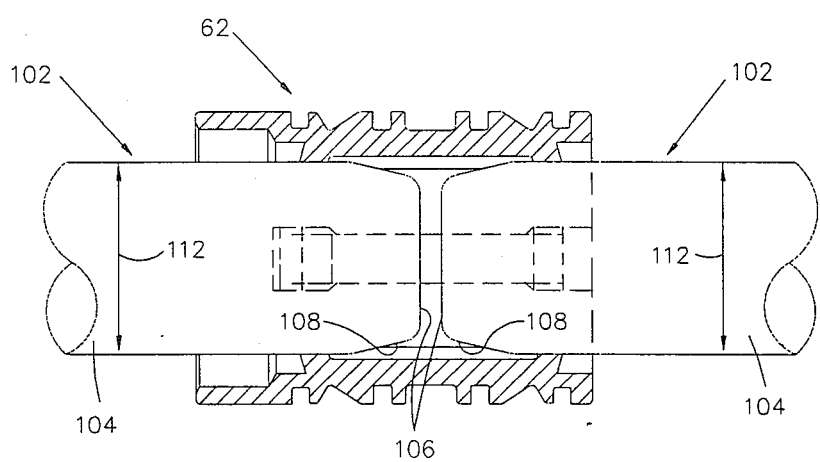
FIG. 10 is a longitudinal cross sectional view of the valve sleeve blank engaged by a pair of second punches.

After the ends of the grooves 44 are closed, the first punches 82, with the mandrels 140, are then removed from engagement with the end surfaces 32, 34 of the valve sleeve blank 62. After the pair of first punches 82 and the mandrels 140 are removed, a pair of second punches 102 (FIGS. 10 and 11) act inside the valve sleeve blank 62 to displace the material 98 axially and radially outwardly to form the seal lands 52. Each of the second punches 102 has a generally cylindrical body portion 104, of a diameter 112, and an end 106. The cylindrical body portion 104 and end 106 are joined by a tapered frustoconical surface 108. The second punches 102 are moved axially towards one another and into the opposite open ends of the valve sleeve blank 62. The second punches 102 engage the portions 98 of the displaced material 92 which extend radially inwardly of the inner surface 26.

As the second punches 102 are advanced axially within the valve sleeve blank 62, the tapered frustoconical surfaces 108 engage the displaced material 98. The displaced material 98, indicated by the dashed lines in FIG. 11, is forced along the tapered frustoconical surfaces 108 as the punches 102 axially advance within the valve sleeve blank 62. The displaced material 98 is forced radially outwardly by the tapered frustoconical surfaces 108 to form an outer end portion 122 of the seal land 52. The tapered frustoconical surfaces 108 also force the displaced material 98 axially into the groove 44 of the valve sleeve blank 62 to form an inner end portion 124 of the seal land 52. This results in providing a relatively long seal land 52, as compared to the prior art process which would machine off the displaced material 98.

The cylindrical body portions 104 of the second punches 102 each have an outer diameter 112 which is substantially equal to the finished diameter 39 of the inner surface 26 of the finished valve sleeve 20 (FIGS. 1 and 2). After the second punches 102 act on the valve sleeve 62, the inner diameter 39 of the valve sleeve blank may then be broached and honed to a final size and finish to provide the finished valve sleeve 20 of FIG. 1.

One valve sleeve was formed in accordance with the present invention using a mandrel 140 having a head end portion 144 with an outside diameter of 0.694 inches. A pair of first punches 82 were used to deform material radially inwardly at 98 (FIG. 11) to a diameter of 0.694 inches. A pair of second punches 102 having an outside diameter of 0.720 inches were then used to force the material 98 radially outwardly and axially to a diameter of 0.720 inches. The resulting inner surface, including the groove end lands 52, was then machined to form a finished inner surface 26 with a diameter of 0.724 inches.

From the above description of a preferred embodiment of the invention, those skilled in the art will perceive improvements, changes and modifications. Such improvements, changes and modifications within the skill of the art are intended to be covered by the appended claims.

Having described a preferred embodiment of the present invention, we claim:

1. In a method of manufacturing a valve sleeve the steps of:
providing a tubular member having a plurality of grooves extending axially along an inner surface of the tubular member through a pair of axially opposite end surfaces of the tubular member, each of the end surfaces extending radially outwardly from an inner surface of the tubular member to an outer surface, each of the grooves having a base surface located between the inner and outer surfaces;
abutting a first punch against at least one of the end surfaces between the base surface of each groove and the outer surface to displace material of the end surface adjacent each groove radially inwardly of the inner surface; and
limiting inward radial displacement of material of the end surface of the tubular member by placing a mandrel inside the tubular member and stopping inward radial displacement of the material by engagement of the material with the mandrel.

2. In a method as defined in claim 1 wherein said step of abutting a first punch comprises the step of simultaneously forcefully abutting a pair of first punches against the axially opposite end surfaces of the tubular member to displace material of the end surfaces adjacent each groove radially inwardly of the inner surface.

3. In a method as defined in claim 1 wherein said step of abutting a first punch against at least one of the end surfaces includes the step of moving the mandrel with the first punch to locate at least a portion of the mandrel inside the tubular member when the first punch abuts the end surface.

4. In a method as defined in claim 3 further comprising the steps of centering the mandrel radially with respect to the first punch and centering the first punch radially with respect to the tubular member while abutting the first punch against at least one of the end surfaces of the tubular member.

5. In a method as defined in claim 1 further comprising the steps of removing the mandrel from inside the tubular member then abutting a second punch against the displaced material of the end surface extending radially inwardly of the inner surface and moving a portion of the displaced material axially and radially outwardly to form a seal land at an end of each groove.

6. In a method as defined in claim 5 wherein said step of abutting a first punch against at least one of the end surfaces includes the step of moving the mandrel with the first punch so as to have at least a portion of the mandrel disposed inside the tubular member when the first punch abuts the end surface.

7. In a method as defined in claim 6 further comprising the steps of centering the mandrel radially with respect to the first punch and centering the first punch radially with respect to the tubular member while abutting the first punch against at least one of the end surfaces of the tubular member.

8. In a method as defined in claim 1 wherein said step of abutting a first punch comprises the step of simultaneously forcefully abutting a pair of first punches against the axially opposite end surfaces of the tubular member to displace material of the end surfaces adjacent each groove radially inwardly of the inner surface, and wherein said step of placing a mandrel inside the tubular member comprises the step of placing inside the tubular member a pair of mandrels associated one with each of the pair of first punches.

9. In a method as defined in claim 8 wherein said step of abutting the pair of first punches against the axially opposite end surfaces of the tubular member includes the step of moving each of the mandrels with its respective first punch to locate at least a portion of each of the mandrels inside the tubular member when the first punches abut the end surfaces.

10. In a method as defined in claim 8 further comprising the steps of removing the mandrels from inside the tubular member then abutting a pair of second punches against the displaced material of the end surfaces extending radially inwardly of the inner surface and moving a portion of the displaced material axially and radially outwardly to form a seal land at each end of each groove.

11. In a method of manufacturing a valve sleeve the steps of:
providing a tubular member having a plurality of grooves extending axially along an inner surface of the tubular member through a pair of axially opposite end surfaces of the tubular member, each of the end surfaces extending radially outwardly from an inner surface of the tubular member to an outer surface, each of the grooves having a base surface located between the inner and outer surfaces;
placing a mandrel inside the tubular member, the mandrel having an outer surface spaced radially inwardly from the inner surface of the tubular member;
abutting a first punch against at least one of the end surfaces between the base surface of each groove and the outer surface to displace material of the end surface adjacent each groove radially inwardly of the inner surface; and
limiting radial displacement of the material by engagement of the material with the outer surface of the mandrel.

* * * * *